United States Patent
Sajjan et al.

(10) Patent No.: US 10,750,358 B1
(45) Date of Patent: Aug. 18, 2020

(54) MANAGING CLUSTERED SUBSCRIPTIONS

(71) Applicant: HEWLETT PACKARD ENTERPRISE DEVELOPMENT LP, Houston, TX (US)

(72) Inventors: Aruna Sajjan, Bangalore (IN); Mario Bertram Vincent, Bangalore (IN); Bhavna Shivnani, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/270,153

(22) Filed: Feb. 7, 2019

(51) Int. Cl.
| | | |
|---|---|---|
| *H04W 8/24* | (2009.01) | |
| *H04W 4/70* | (2018.01) | |
| *H04W 4/029* | (2018.01) | |
| *H04W 4/08* | (2009.01) | |
| *H04W 8/00* | (2009.01) | |

(52) U.S. Cl.
CPC ............ *H04W 8/24* (2013.01); *H04W 4/029* (2018.02); *H04W 4/08* (2013.01); *H04W 4/70* (2018.02); *H04W 8/005* (2013.01)

(58) Field of Classification Search
CPC ......... H04W 8/24; H04W 4/70; H04W 4/029; H04W 4/08; H04W 8/005
See application file for complete search history.

(56) References Cited

U.S. PATENT DOCUMENTS

| | | |
|---|---|---|
| 8,989,729 B2 | 3/2015 | Barclay et al. |
| 9,326,173 B2 | 4/2016 | Luft |
| 9,615,240 B2 | 4/2017 | Yang |
| 2006/0187043 A1* | 8/2006 | Allen .................... G06Q 10/087 340/572.1 |
| 2007/0123287 A1* | 5/2007 | Mock .................. H04L 41/0686 455/518 |
| 2007/0281690 A1* | 12/2007 | Altman ................. H04W 4/185 455/435.1 |
| 2014/0010173 A1* | 1/2014 | Zakrzewski ............ H04W 8/26 370/329 |

(Continued)

OTHER PUBLICATIONS

Tarik Taleb and Andreas Kunz, "Machine Type Communications in 3GPP Networks: Potential, Challenges, and Solutions," IEEE Communications Magazine, Mar. 2012. pp. 178-184. IEEE.

(Continued)

*Primary Examiner* — Dinh Nguyen
(74) *Attorney, Agent, or Firm* — Nolte Intellectual Property Law Group (57) ABSTRACT

Systems and methods are provided for managing clustered subscriptions. A method for managing clustered subscriptions may include identifying radio frequency enabled devices, each having a radio frequency enabled device unique identifier, to add to a cluster; requesting a unique cluster identifier from a control plane within a telecommunications network; generating the unique cluster identifier; associating the unique cluster identifier with each of the radio frequency enabled device unique identifiers; storing, in the control plane, the unique cluster identifier in association with each of the radio frequency enabled device unique identifiers; requesting, via the control plane, a status from each radio frequency enabled device within a subset of the radio frequency enabled devices; and transmitting the status to an external user via a data plane within the telecommunications network.

20 Claims, 5 Drawing Sheets

(56) References Cited

U.S. PATENT DOCUMENTS

2016/0381724 A1 12/2016 Zakrzewski
2017/0310585 A1* 10/2017 Kim ..................... H04W 40/02

OTHER PUBLICATIONS

Youtube, "CSMA IoT Connection Efficiency Guidelines", available online at<https://web.archive.org/web/20180527201306/https://www.gsma.com/iot/gsma-iot-device-connection-efficiency-guidelines/>, May 27, 2018, 7 pages.

* cited by examiner

MANAGING CLUSTERED SUBSCRIPTIONS

BACKGROUND

The "everything connected" world is being built with the Internet of Things (IoT) framework. Wireless telecommunications networks, such as a global system for mobile communications (GSM) network, a universal mobile telecommunications system (UMTS), a Long Term Evolution (LTE) telecommunications system, a 5G telecommunications system, or any telecommunications system, may be utilized for the associated communications. These networks provide an infrastructure for a data plane upon which communications between radio frequency enabled devices can occur. The telecommunications networks are typically managed at a control plane level where network operations and maintenance functions can be performed.

BRIEF DESCRIPTION OF THE DRAWINGS

The present disclosure may be understood from the following detailed description when read with the accompanying Figures. In accordance with the standard practice in the industry, various features are not drawn to scale. In fact, the dimensions of the various features may be arbitrarily increased or reduced for clarity of discussion.

Some examples of the present application are described with respect to the following figures.

DETAILED DESCRIPTION

Illustrative examples of the subject matter claimed below will now be disclosed. In the interest of clarity, not all features of an actual implementation are described in this specification. It may be appreciated that in the development of any such actual example, numerous implementation-specific decisions may be made to achieve the developers' specific goals, such as compliance with system-related and business-related constraints, which will vary from one implementation to another. Moreover, it may be appreciated that such a development effort, even if complex and time-consuming, would be a routine undertaking for those of ordinary skill in the art having the benefit of this disclosure.

It is expected that the count of radio frequency enabled devices that subscribe to the IoT framework may expand, imposing a potential messaging and data burden on, the telecommunications networks. One reason the, IoT framework places a messaging burden upon the telecommunications network is that many of the software applications used to manage the IoT run purely on the data plane. The software applications are agnostic, or even uncaring, about the underlying telecommunications network, just "assume" that the network is available, and perform their operations over the telecommunications network data plane. It is assumed that the radio frequency enabled device is reachable and is individually controlled and addressed by its controlling application. This individual messaging and control may be implemented for "individual" instances of IoT radio frequency enabled devices, such as, perhaps, a smart home thermostat that may be uniquely controlled by its owner; but when it comes to groups of radio frequency enabled devices that may be controlled together, this "separate" messaging and control may be performed at the control plane level.

Managing groups of radio frequency enabled devices together at the control plane of a telecommunications network may reduce the messaging requirements on the telecommunications network and allow operators to maximize the utilization of their networks. It may also allow network operators to offer new and unique services to the IoT application vendors and other radio frequency enabled device vendors by exposing these "clustered management" capabilities for managing clustered subscriptions to the vendors and or their Application Programming Interfaces (APIs).

Accordingly, examples of the present disclosure may allow for managing clustered subscriptions by identifying radio frequency enabled devices, each having a radio frequency enabled device unique identifier, to add to a cluster; requesting a unique cluster identifier from a control plane within a telecommunications network; generating the unique cluster identifier; associating the unique cluster identifier with each of the radio frequency enabled device unique identifiers; storing, in the control plane, the unique cluster identifier in association with each of the radio frequency enabled device unique identifiers; requesting, via the control plane, a status from each radio frequency enabled device within a subset of the radio frequency enabled devices; and transmitting the status to an external user via a data plane within the telecommunications network.

In addition, examples may provide for monitoring the location of each radio frequency enabled device by periodically requesting a status from each radio frequency enabled device, wherein requesting the status comprises requesting a location for each radio frequency enabled device; receiving the location from two or more radio frequency enabled devices; determining a triangulated central location of the radio frequency enabled devices; determining the distance between the triangulated central location and each radio frequency enabled device; and transmitting a message to an external user via the data plane when a radio frequency enabled device is determined to be a configurable distance from the triangulated central location. Requesting status from radio frequency enabled devices over the control plane may reduce the messaging requirements on the telecommunications network and allow operators to maximize the utilization of their networks.

In examples, status may include information about a location or location coordinates in two dimensions or three dimensions, systems health data, speed, acceleration, altitude, battery or energy supply levels, communications link strength, error detection data, software status data, and or any other data that may be available from a given radio frequency enabled device Further, this approach may be applied to any telecommunications system with a control plane, including but not limited to GSM (2G), UMTS (3G), LTE (4G), or 5G telecommunications systems.

Figure 1:
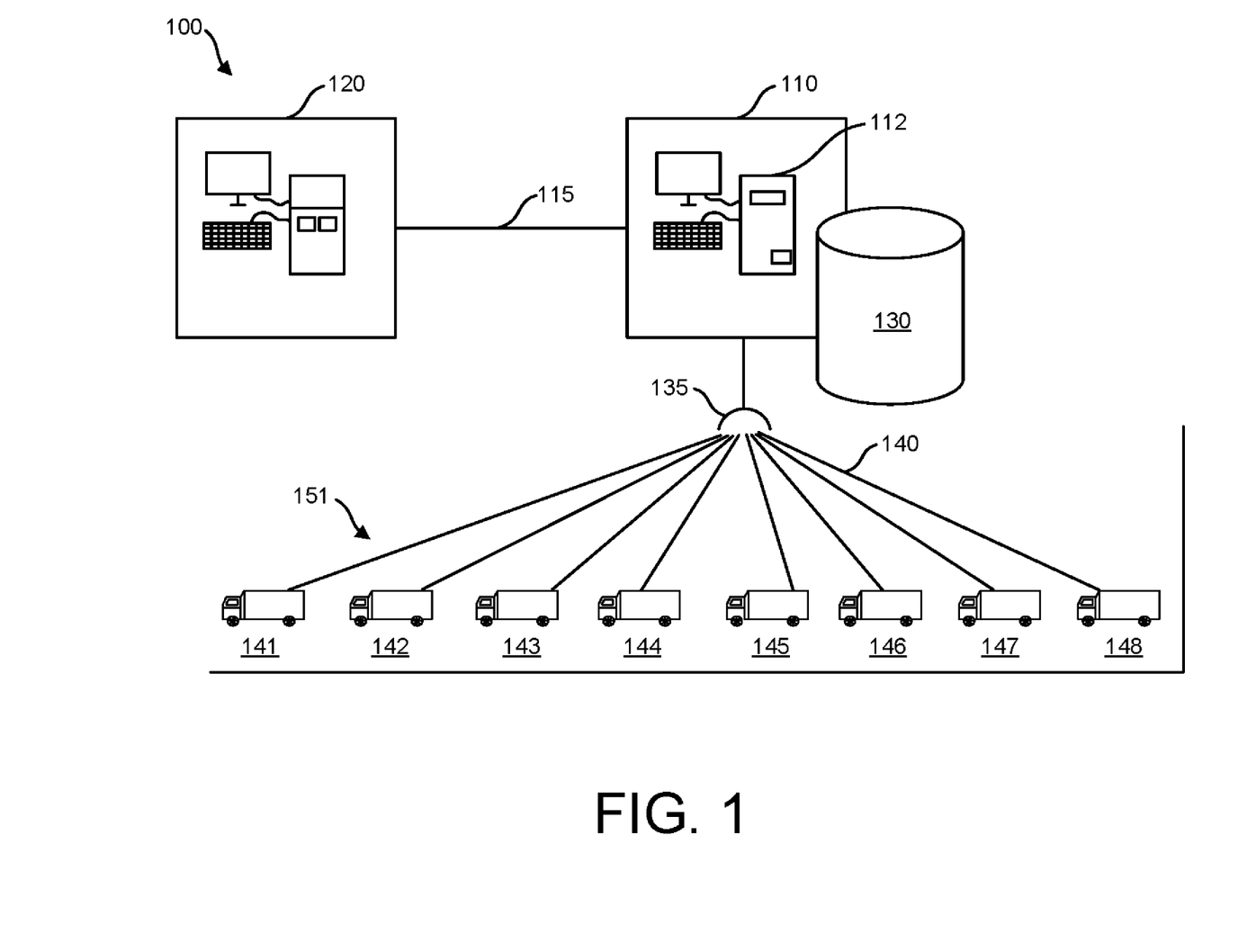
FIG. 1 is a system for managing clustered subscriptions, according to one or more examples described.

Turning now to the drawings, FIG. 1 is a system 100 for managing clustered subscriptions, according to one or more examples described. The system 100 may include a telecommunications network switching system 110 in communication with an external user or a user application server 120 via a data plane or a communications link 115. The switching system 110 may be in communication with the external user or the user application server 120 via any means including an internet connection or any communications capability. The system 100 may also include a storage capability or switching system database 130, a transmit and receive capability 135 to at least transmit and receive voice and or data over radio frequency transmissions 140. Although shown separately, the data plane 115 may include the transmit and receive capability 135 for sending and receiving radio frequency communications. The switching system 110 may be managed by one or more switching system servers 112 (one shown). The switching system 110 may communicate with one or more radio frequency enabled devices, for example, radio frequency enabled devices 141 through 148. The switching system 110 may operate at the control plane level and may be responsible for performing call and data processing. The switching system 110 may track one or more user subscriptions and respond to authentication and authorization requests based on various message sequences, e.g., GSM standards. The various message sequences may, for example, be based on the mobile application part (MAP) protocol, for 2G/3G networks, or on the Diameter protocol, for the 4G/LTE and 5G networks.

The switching system 110 may request status information from one or more of the radio frequency enabled devices 141-148. The status request to the radio frequency enabled devices 141-148 may be performed once, anytime, at the beginning of a particular event, or periodically at random or selected time intervals. An external user may select the time intervals, or the time intervals may be randomly selected by the switching system 110. The requested status may include status information. The status information may include a location or location coordinates in two dimensions or three dimensions, systems health data, speed, acceleration, altitude, battery or energy supply levels, communications link strength, error detection data, software status data, and or any other data that may be available from a given radio frequency enabled device 141-148. The status information may include short message service (SMS) transmissions.

The radio frequency enabled devices 141-148 may include any device that is capable of transmitting and receiving radio frequency signals and or data within a telecommunications network. Two or more radio frequency enabled devices 141-148 may be known as a cluster 151. For example, the cluster 151 may include radio frequency enabled devices 141-143, 143-148, 142-146, or any combination of the radio frequency enabled devices 141-148.

Each radio frequency enabled device 141-148 may have a unique identifier referred to as the international mobile subscriber identity (IMSI), that may be tied to a subscriber or user subscription stored within the switching system database 130. The IMSI may identify the home telecommunications network of the radio frequency enabled device 141-148 and the home country of the telecommunications network. Each radio frequency enabled device 141-148 may also have a mobile station international subscriber number (MSISDN). The MSISDN may be a number used to route calls or other data to the subscriber.

An external user or vendor may seek to utilize one or more of the examples described herein. For example, the external user or vendor may seek to manage a convoy of vehicles or the location of a group of objects by identifying radio frequency enabled devices, such as radio frequency enabled devices 141-148, to add to a cluster 151 and sending a list of radio frequency enabled device unique identifiers to the switching system 110. The management of the convoy or group of objects may be performed via the switching system 110 at the control plane. The switching system 110 may receive the list of radio frequency enabled device unique identifiers and generate a unique cluster identifier for the cluster 151 of radio frequency enabled devices. The switching system 110 may associate the unique cluster identifier with each of the radio frequency enabled device unique identifiers and store the associated relationships within the switching system database 130. The switching system 110 may store two or more unique cluster identifiers. Each of the two or more unique cluster identifiers may be stored in association with a unique cluster of radio frequency enabled device unique identifiers from a corresponding cluster of radio frequency enabled devices (not shown).

The management may include monitoring the location and or speed of one or more radio frequency enabled devices 141-148 within the cluster 151. The management may include monitoring the location and or speed of one or more of the radio frequency enabled devices 141-148 within the cluster 151 along a predetermined conduit or path in space and or time (not shown). For example, the management may be of a convoy of vehicles, each vehicle including one of the radio frequency enabled devices 141-148. The vehicles may be capable of flight. For example, the vehicles may be drones or other flying vehicles. The vehicles may be stationary or traveling on land, at sea, under the sea, under the ground, in the air, or on orbit around the earth or other planetary body. The monitoring may be in two-dimensional or three-dimensional space. The monitoring may be performed for a discrete moment in time or tracked over a period of time. The monitoring may be performed by periodically requesting a status from one or more of the radio frequency enabled devices 141-148. Requesting the status may include requesting a speed for one or more radio frequency enabled devices 141-148. Requesting the status may include requesting a location for one or more radio frequency enabled devices 141-148. Requesting a status may include requesting a location for two or more radio frequency enabled devices 141-148; receiving the location from the two or more radio frequency enabled devices 141-148; determining a triangulated central location of the radio frequency enabled devices 141-148; and determining a distance between the triangulated central location and one or more of the radio frequency enabled devices 141-148.

The switching system 110 may transmit a status, message, or command via the data plane to an external user when one or more radio frequency enabled devices 141-148 are determined to be stationary or moving. The switching system 110 may transmit the status, message, or command via the data plane to the external user when one or more radio frequency enabled devices 141-148 are determined to be a configurable distance from the triangulated central location. The switching system 110 may transmit the status, message, or command via the data plane to the external user when one or more radio frequency enabled devices 141-148 are determined to be a configurable distance from the predetermined path. The switching system 110 may transmit the status, message, or command via the data plane to the external user when one or more radio frequency enabled devices 141-148 are determined to be traveling at a speed outside a configurable range of speeds. For example, the switching system 110 may transmit the status, message, or command via the data plane to the external user when one or more radio frequency enabled devices 141-148 are determined to be traveling at a speed above a legal speed limit along the predetermined path. The switching system 110 may transmit the status, message, or command via the data plane to the external user when one or more radio frequency enabled devices 141-148 are determined to be stationary for a configurable period of time. The switching system 110 may transmit the status, message, or command via the data plane to the external user when the location for one or more radio frequency enabled devices 141-148 is not received by the switching system 110, wherein the message identifies the one or more radio frequency enabled devices 141-148 for which location information is not received.

The message may be in any form including SMS, audible, or any digital or non-digital message. The status command may be in any form. The status, message, or command may be transmitted to any external user device including servers, computers, cloud networks, cellular phones, other telecommunications networks, or systems. The external user may send an alert message, such as an SMS message or audible message, to a subset of the radio frequency enabled devices within the radio frequency enabled devices 141-148 by sending a request to the switching system 110 to send the alert message to the subset of the radio frequency enabled devices within radio frequency enabled device 141-148. The switching system 110 may send the alert message to the subset of the radio frequency enabled devices within the radio frequency enabled devices 141-148 by sending an SMS. For example, the SMS message may be sent to the subset of radio frequency enabled devices that may include radio frequency enabled device 141, radio frequency enabled device 145, and or one or more of the radio frequency enabled devices 141-148 determined to be configurable distance from the triangulated central location. The alert message may be in any form including SMS, audible, or any digital or non-digital format. Although the radio frequency enabled devices 141-148 are shown, any number of radio frequency enabled devices may be included in a cluster of radio frequency enabled devices.

Figure 2:
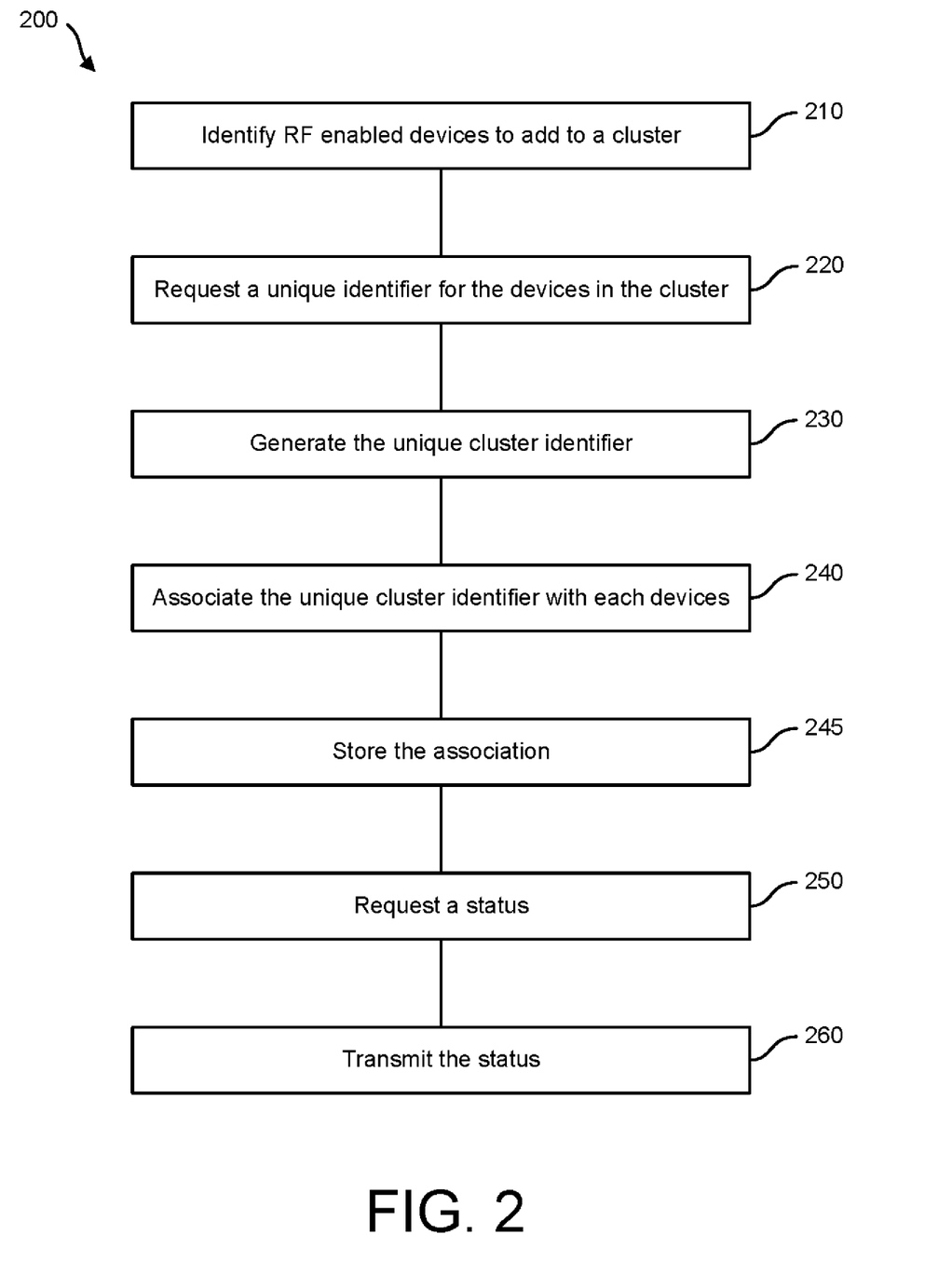
FIG. 2 is a flow chart depicting a method for managing clustered subscriptions, according to one or more examples described.

FIG. 2 is a flow chart depicting a method 200 for managing clustered subscriptions, according to one or more examples described. The method 200 may include identifying one or more radio frequency enabled devices, each radio frequency enabled device having a radio frequency enabled device unique identifier, to add to a cluster or group of radio frequency enabled devices (block 210); requesting a unique cluster identifier for the radio frequency enabled devices in the cluster (block 220); generating the unique cluster identifier (block 230); associating the unique cluster identifier with each of the radio frequency enabled device unique identifiers in the cluster (block 240); storing the unique cluster identifier in association with each of the radio frequency enabled device unique identifiers (block 245); and requesting a status from a subset of the radio frequency enabled devices (block 250). The subset of radio frequency enabled devices may be chosen from a predetermined list. The predetermined list may be provided by the external user. The subset of radio frequency enabled devices may be chosen randomly.

The method 200 may include the switching system (FIG. 1, 110) within the control plane generating the unique cluster identifier (block 230); the switching system (FIG. 1, 110) associating the unique cluster identifier with each of the radio frequency enabled device unique identifiers (block 240); the switching system (FIG. 1, 110) storing the unique cluster identifier in association with each of the radio frequency enabled device unique identifiers in the cluster (block 245); and the switching system (FIG. 1, 110) requesting a status from the subset of the radio frequency enabled devices (block 250). The method 200 may include transmitting the status information (block 260) to the external vendor or user application server (FIG. 1, 120) via the data plane (FIG. 1, 115) within the telecommunications network.

The method 200 may include the switching system (FIG. 1, 110) within the control plane storing two or more unique cluster identifiers, each of the two or more cluster identifiers being stored in association with each of the radio frequency enabled device unique identifiers in a corresponding cluster of radio frequency enabled devices.

Requesting a status from each of the subset of radio frequency enabled devices (block 250) may include requesting a location from the subset of the radio frequency enabled devices. The method 200 may include the control plane receiving the locations, determining a general or central geographic location of the cluster by triangulating the received locations, and sending a triangulated central location to the user application server (FIG. 1, 120).

Figure 3:
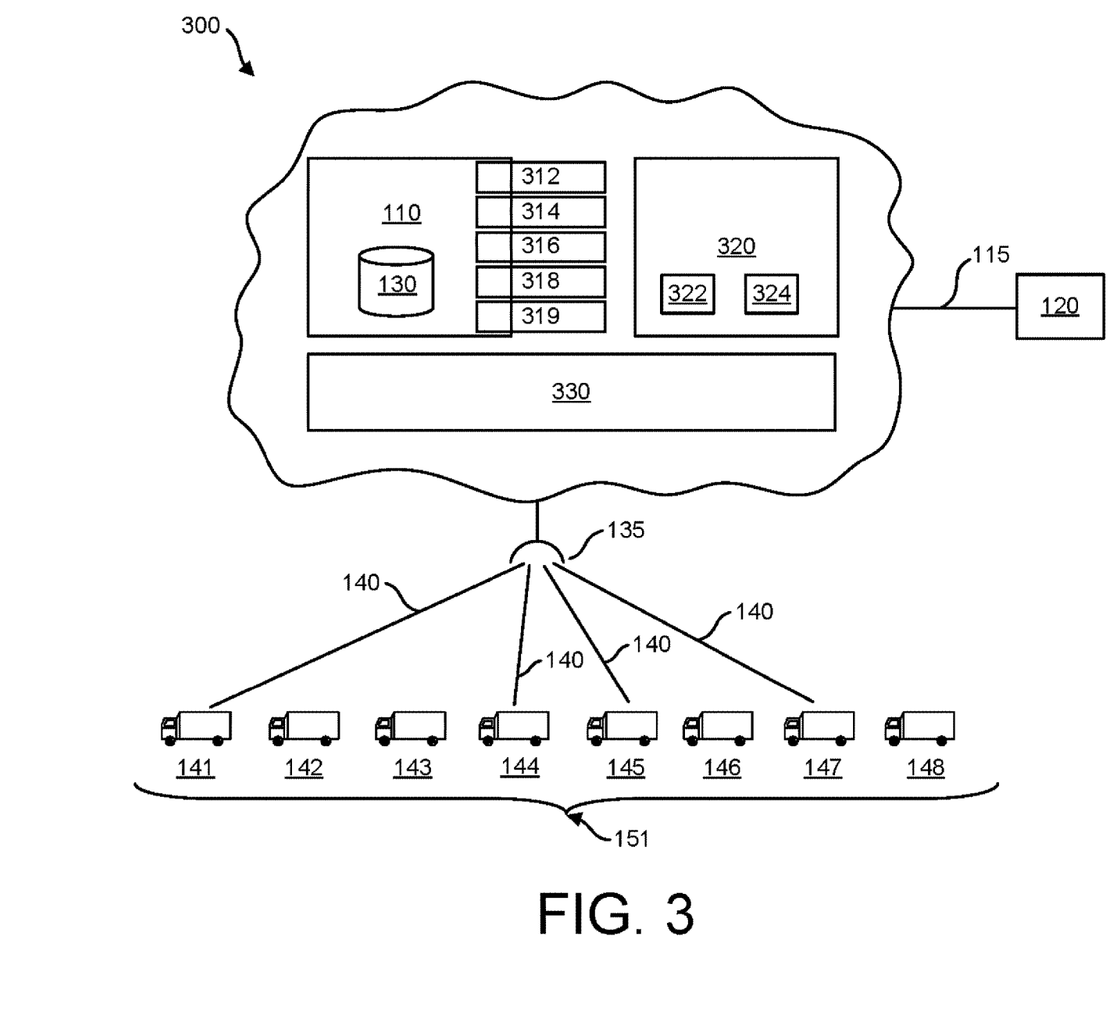
FIG. 3 is an example telecommunications network, according to one or more examples described.

FIG. 3 is an example telecommunications network 300, according to one or more examples described. The telecommunications network 300 may be any telecommunications network. For example, the telecommunications network 300 may be a GSM, UMTS, LTE, or 5G telecommunications network. For illustrative purposes, without limiting the scope of this disclosure, the telecommunications network 300 is described below with reference to the GSM and or the UMTS type telecommunications networks.

The telecommunications network 300 may include the control plane where telecommunications network 300 operations and maintenance functions are performed. The telecommunications network 300 may include the data plane 115 where communications may take place between two or more external users 120 of the telecommunications network 300. For example, external users may purchase access to the telecommunications network 300 by purchasing a subscription from a personal communications service (PCS) or digital cellular operator. Communications may take place along the data plane 115 between one or more external users 120 and one or more operators or internal users of the telecommunications network 300. The communications may include audio, video, digital, or any form of communications. The telecommunications network 300 may be divided into three major systems: the switching system (SS) 110, a base station system (BSS) 320, and an operation and support system (OSS) 330.

The switching system 110 may include the control plane where telecommunications network 300 operations and maintenance functions are performed. The switching system 110 may include a home location register (HLR) 312, a mobile services switching center (MSC) 314, a visitor location register (VLR) 316, an authentication center (AUC) 318, and an equipment identity register (EIR) 319. The HLR 312 may be a database used to store and manage subscriptions. The HLR 312 may store permanent data about subscribers, including a subscriber's service profile, location information, and activity status. If an external user purchases the subscription from the PCS or digital cellular operator, the subscription information may be registered in the HLR 312 of that operator. The MSC 314 may perform the telephony switching functions of the system. It may control calls to and from other telephone and data systems. It also may perform such functions as toll ticketing, network interfacing, common channel signaling, and others. The VLR 316 may be a database that contains temporary information about subscribers that may be used by the MSC 314 in order to service visiting subscribers. The VLR 316 may be integrated with the MSC 314. When a mobile station roams into a new MSC 314 area, the VLR 316 may request data about the mobile station from the HLR 312. If the mobile station makes a call, the VLR 316 will have the information that may be used for call setup without having to interrogate the HLR 312 each time. The AUC 318 may provide authentication and encryption parameters that verify the user's identity and ensure the confidentiality of each call. The AUC 318 may protect telecommunications network 300 operators from different types of fraud found in cellular systems. The EIR 319 may be a database that contains information about the identity of mobile equipment that prevents calls from stolen, unauthorized, or defective radio frequency enabled devices. The AUC 318 and EIR 319 may be implemented as stand-alone nodes or as a combined AUC/EIR node. Each database may be stored separately or combined within the switching system database 130.

The switching system 110 may include other computing capabilities or servers. The switching system 110 may, through a processor and tangible, non-transitory computer readable medium that stores code for performing switching system 110 functions, run one or more functions of the telecommunication network 300.

The BSS 320 may be responsible for radio-related functions and may include the data plane 115 over which the transmit and receive capability 135 for the telecommunications network 300 may operate. The BSS may be divided into two segments, one or more base station controllers (BSCs) 322 and one or more base station transceiver stations (BTSs) 324. The BSCs 322 may provide the control functions and physical links between the MSC 314 and the BTSs 324. The BSCs 322 may be high-capacity switches that provide functions such as handover, cell configuration data, and control of radio frequency power levels in BTSs 324. One or more BSCs 322 may be served by the MSC 314. The BTSs 324 may handle the radio interface to a mobile station. The BTSs 324 may function as the radio transceivers and antennas that may service each cell in the telecommunications network 300. One or more BTSs 324 may be controlled by a BSC 322.

The OSS 330 may be connected to equipment in the switching system 310 and to the BSCs 322. The OSS 330 may be the functional entity from which the telecommunications network 300 operator monitors and controls the system. The OSS 330 may provide the telecommunications network 300 overview and support the maintenance activities of different operation and maintenance organizations. It should be understood that the above description for the telecommunications network 300 may be replaced, without limiting the scope of this disclosure, with descriptions of other example telecommunications networks. For example, the description for telecommunications network 300 may be replaced with examples that reflect the characteristics of a LTE, 5G, or any other telecommunications network and the examples described herein may be performed, without limitation, utilizing these other telecommunications networks.

The examples described herein may be implemented through the telecommunications network 300 or similarly through any other telecommunications network. For example, the method of FIG. 2 may be implemented where one or more users, who may be internal or external users, may identify one or more radio frequency enabled devices 141-148, each radio frequency enabled device 141-148 having a radio frequency enabled device unique identifier, to add to the cluster 151 of radio frequency enabled devices (FIG. 2, block 210). The one or more users may request one or more unique cluster identifiers to associate with the cluster 151 of radio frequency enabled devices (FIG. 2, block 220) and or may transmit the radio frequency enabled device unique identifiers from the one or more radio frequency enabled devices 141-148 in the cluster 151 to the telecommunications network 300. The radio frequency enabled device unique identifiers may be transmitted via the data plane 115. The telecommunications network 300 may receive the request to generate the unique cluster identifier or may receive the radio frequency enabled device unique identifiers and interpret the receipt as a request to generate the unique cluster identifier for the cluster 151 of radio frequency enabled devices. The switching system 110 may generate the unique cluster identifier for the cluster 151 of radio frequency enabled devices (FIG. 2, block 230). The switching system 110 may associate the unique cluster identifier with each of the radio frequency enabled device unique identifiers in the cluster 151 of radio frequency enabled devices (FIG. 2, block 240). The switching system 110 may store the unique cluster identifier in association with each of the radio frequency enabled device unique identifiers (FIG. 2, block 245). The switching system 110 may store any number of unique cluster identifiers for retrieval. The switching system 110 may request the status from a subset of the radio frequency enabled devices (FIG. 2, block 250). The subset of radio frequency enabled devices may be chosen from a predetermined list. The predetermined list may be provided by the external user. The subset of radio frequency enabled devices may be chosen randomly. The switching system 110 may transmit the status information (FIG. 2, block 260) to the external user or the user application server (FIG. 1, 120) via the data plane 115 within the telecommunications network 300.

Requesting a status from each of the subset of radio frequency enabled devices (FIG. 2, block 250) may include requesting a location from the subset of the radio frequency enabled devices. The switching system 110 may, via the control plane, receive the locations, determine a general or central geographic location of the cluster by triangulating the received locations, and send a triangulated central location to the external user.

Figure 4:
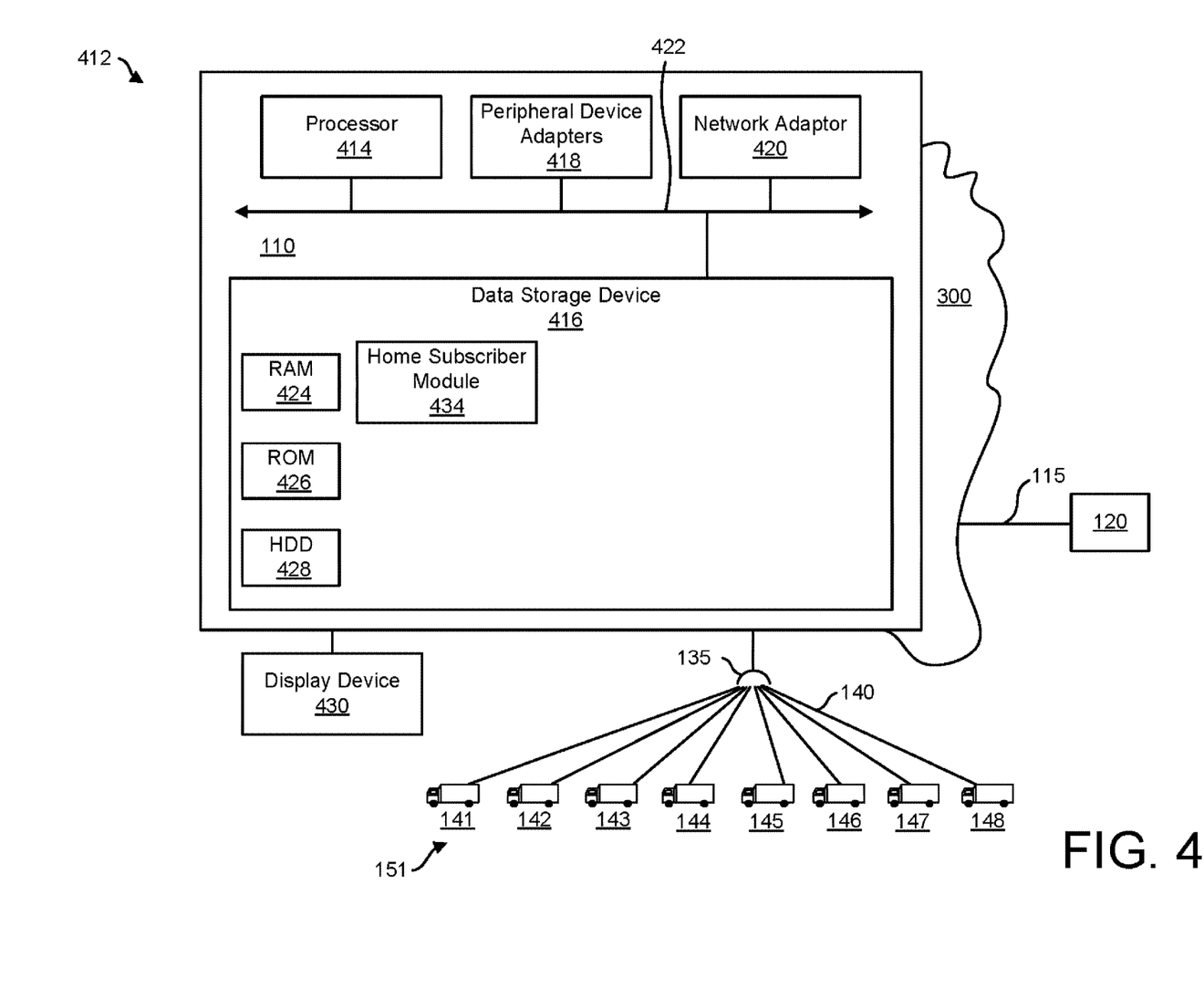
FIG. 4 is a is a computing system for managing clustered subscriptions over a telecommunications network, according to one or more examples described.

FIG. 4 is a computing system 412 for managing clustered subscriptions over a telecommunications network 300, according to one or more examples described. The switching system 110 may include the computing system 412. The computing system 412 may be implemented in an electronic device. Examples of electronic devices include servers, desktop computers, laptop computers, cloud based computers, personal digital assistants (PDAs), mobile devices, smartphones, gaming systems, and tablets, among other electronic devices.

The computing system 412 may be utilized in any data processing scenario including, stand-alone hardware, mobile applications, through a computing network, or combinations thereof. Further, the computing system 412 may be used in a computing network, a public cloud network, a private cloud network, a hybrid cloud network, the telecommunications network 300, other forms of networks, or combinations thereof. In one example, the methods provided by the computing system 412 are provided as a service over the telecommunications network 300 by, for example, a third party.

To achieve its desired functionality, the computing system 412 includes various hardware components. Among these hardware components may be a number of processors 414, a number of data storage devices 416, a number of peripheral device adapters 418, and a number of network adapters 420. These hardware components may be interconnected through the use of a number of busses and/or network connections. In one example, the processor 414, data storage device or tangible, non-transitory computer readable medium 416, peripheral device adapters 418, and a network adapter 420 may be communicatively coupled via a bus 422.

The processor 414 may include the hardware architecture to retrieve executable code from the data storage device 416 and execute the executable code. The executable code may, when executed by the processor 414, cause the processor 414 to implement at least the functionality of generating a unique cluster identifier, associating the unique cluster identifier with each unique identifier within the cluster 151 of radio frequency enabled devices, requesting a status from each radio frequency enabled device within a subset of the radio frequency enabled devices, and determining a location of the cluster 151 of radio frequency enabled devices by triangulating received coordinates, as well as other functionality. For example, the executable code may, when executed by the processor 414, cause the processor 414 to implement at least the functionality of requesting a status from each radio frequency enabled device within the cluster 151 of radio frequency enabled devices. The functionality of the computing system 412 is in accordance to the methods of the present specification described herein. In the course of executing code, the processor 414 may receive input from and provide output to a number of the remaining hardware units.

The data storage device 416 may store data such as executable program code that is executed by the processor 414 or other processing device. The processor 414 may be a central processing unit that is to execute an operating system in the computing system 412. As will be discussed, the data storage device 416 may specifically store computer code representing a number of applications that the processor 414 executes to implement at least the functionality described herein.

The data storage device 416 may include various types of memory modules, including volatile and nonvolatile memory. For example, the data storage device 416 of the present example includes Random Access Memory (RAM) 424, Read Only Memory (ROM) 426, and Hard Disk Drive (HDD) memory 428. Many other types of memory may also be utilized, and the present specification contemplates the use of many varying type(s) of memory in the data storage device 416 as may suit a particular application of the principles described herein. In certain examples, different types of memory in the data storage device 416 may be used for different data storage functions. For example, in certain examples the processor 414 may boot from Read Only Memory (ROM) 426, maintain nonvolatile storage in the Hard Disk Drive (HDD) memory 428, and execute program code stored in Random Access Memory (RAM) 424.

The data storage device 416 may include a computer readable medium, a computer readable storage medium, or a non-transitory computer readable medium, among others. For example, the data storage device 416 may be, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain or store a program for use by or in connection with an instruction execution system, apparatus, or device.

The hardware adapters 418, 420 in the computing system 412 enable the processor 414 to interface with various other hardware elements, external and internal to the computing system 412. For example, the peripheral device adapters 418 may provide an interface to input/output devices, such as, for example, display device 430, a mouse, or a keyboard. The peripheral device adapters 418 may also provide access to other external devices such as an external storage device, a number of network devices such as, for example, servers, switches, and routers, client devices, other types of computing devices, and combinations thereof.

The display device 430 may be provided to allow a user of the computing system 412 to interact with and implement the functionality of the computing system 412. The peripheral device adapters 418 may also create an interface between the processor 414 and the display device 430, a printer, or other media output devices. The network adapter 420 may provide an interface to other computing devices within, for example, a network, thereby enabling the transmission of data between the computing system 412 and other devices located within the network. The network adapter 420 may provide an interface to an external telecommunications network such as a cellular phone network, the telecommunications network 300, or other radio frequency enabled network, thereby enabling the transmission of data between the computing system 412 and other external devices such as an external storage device, a number of network devices such as, for example, servers, switches, and routers, client servers, radio frequency enabled devices, other client devices, other types of computing devices, and combinations thereof.

The computing system 412 may, when executed by the processor 414, display the number of graphical user interfaces (GUIs) on the display device 430 associated with the executable program code representing the number of applications stored on the data storage device 416. The GUIs may display, for example, interactive screenshots that allow a user to interact with the computing system 412 to input commands in association with telecommunication network 300 commanding in association with a home subscriber module 434 as will be described in more detail below. Examples of display devices 430 include a computer screen, a laptop screen, a mobile device screen, a personal digital assistant (PDA) screen, and a tablet screen, among other display devices 430.

The computing system 412 may further include the home subscriber module 434. As will be described in more detail below, the home subscriber module 434 may include the necessary software and hardware, including the tangible, non-transitory computer readable medium, for receiving and processing information from, storing information, commanding, sending information to, sending messages to, and querying radio frequency enabled devices 141-148. The home subscriber module 434 may be used in a number of applications. For example, the home subscriber module 434 may be used to determine a triangulated central location for a cluster 151 of radio frequency enabled devices by triangulating location information from two or more of the radio frequency enabled devices 141-148 within the cluster 151. The home subscriber module 434 may determine the distance between the triangulated central location for the cluster 151 and each radio frequency enabled device 141-148 in the cluster 151. The home subscriber module 434 may determine the distance between each radio frequency enabled device 141-148 and the predetermined path in space and or time (not shown).

The home subscriber module 434 may send instructions to store and retrieve one or more unique cluster identifiers. Each of the one or more unique cluster identifiers may be stored in association with a unique cluster of radio frequency enabled device unique identifiers from a corresponding cluster of radio frequency enabled devices (not shown). The home subscriber module 434 may send instructions to transmit a status, message, or command to an external user via the data plane and or to one or more of the radio frequency enabled devices 141-148 via the control plane when one or more radio frequency enabled devices 141-148 is determined to be a configurable distance from the triangulated central location or the predetermined path. The home subscriber module 434 may send instructions to transmit a status, message, or command to an external user via the data plane and or to one or more of the radio frequency enabled devices 141-148 via the control plane when one or more radio frequency enabled devices 141-148 is determined to be traveling at a speed outside a configurable range of speeds. For example, the home subscriber module 434 may send instructions to transmit a status, message, or command to an external user via the data plane or to one or more of the radio frequency enabled devices 141-148 via the control plane when one or more radio frequency enabled devices 141-148 is determined to be traveling at a speed above a legal speed limit along the predetermined path. The home subscriber module 434 may send instructions to transmit a status, message, or command to an external user via the data plane and or to one or more of the radio frequency enabled devices 141-148 when the location and or speed for one or more radio frequency enabled devices 141-148 is not received, where the message identifies the one or more radio frequency enabled devices 141-148 from which the location and or speed has not been received.

Although the home subscriber module 434 is depicted as being internal to the data storage device 416, in another example, the home subscriber server 434 may be a peripheral device coupled to the computing system 412 or included within a peripheral device coupled to the computing system 412. Although the home subscriber module 434 is depicted as a separate module, it may be integrated with many other modules within the switching system 110.

The computing system 412 may further includes a number of modules used in the implementation of the systems and methods described herein. The various modules within the computing system 412 include executable program code that may be executed separately. In this example, the various modules may be stored as separate computer program products. In another example, the various modules within the computing system 412 may be combined within a number of computer program products; each computer program product including a number of the modules.

Figure 5:
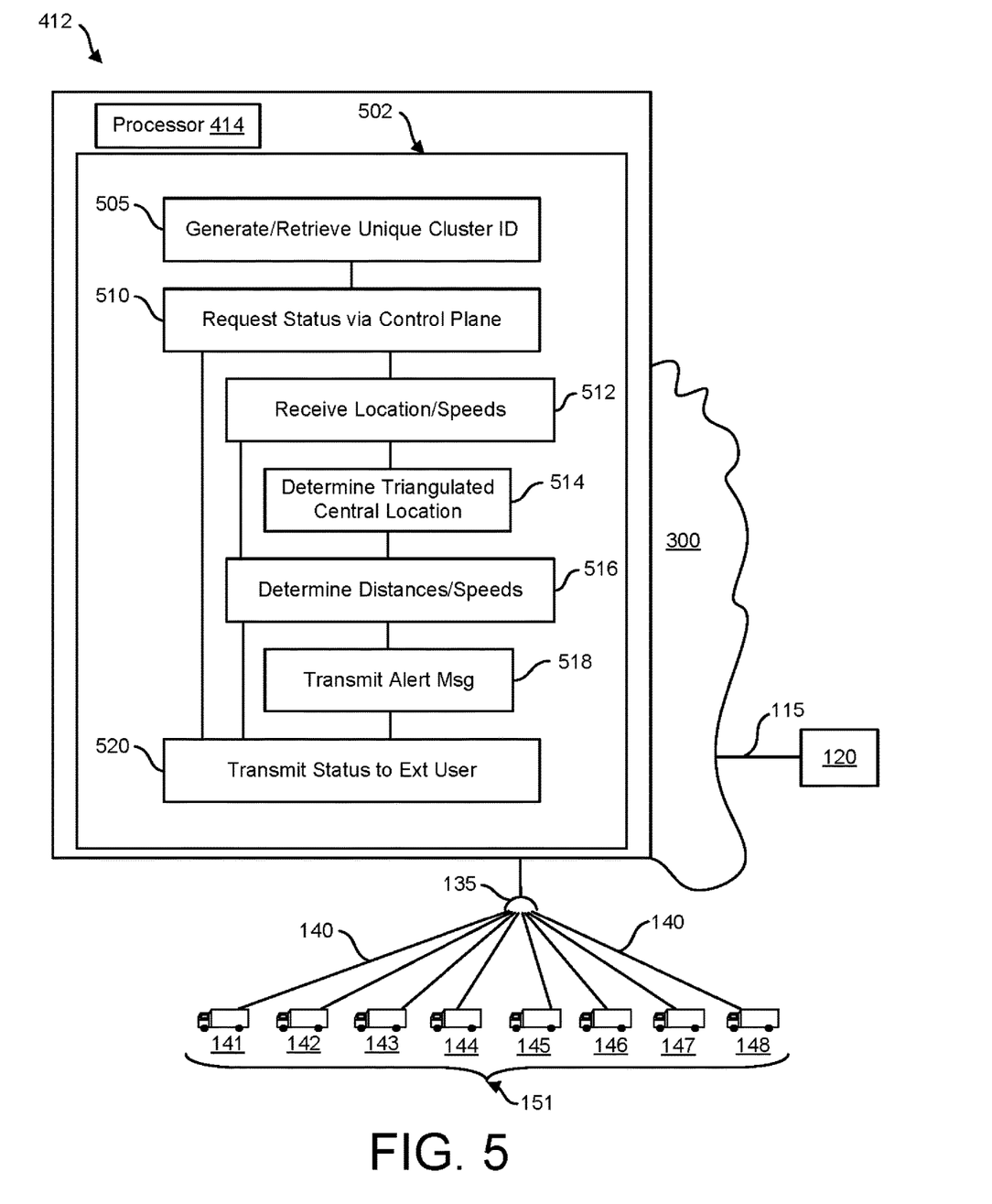
FIG. 5 is a non-transitory computer-readable medium including computer executable instructions stored thereon within the computing system of FIG. 4, according to one or more examples described.

FIG. 5 is a non-transitory computer-readable medium 502 comprising computer executable instructions 500 stored thereon within the computing system of FIG. 4, according to one or more examples described. When the computer executable instructions 500 are executed by the one or more processors 414, the computer executable instructions 500 may cause the one or more processors 414 to generate a unique cluster identifier (block 505), associate the unique cluster identifier (not shown) with each unique identifier within a cluster 151 of radio frequency enabled devices, request a status via the control plane (block 510) from each radio frequency enabled device within a subset of the radio frequency enabled devices 141-148, and determine a triangulated central location of the cluster 151 of radio frequency enabled devices by triangulating received location coordinates (block 512, and 514), as well as other functionality. For example, when the computer executable instructions 500 are executed by the one or more processors 414, the computer executable instructions 500 may cause the one or more processors 414 to implement at least the functionality of requesting a status via the control plane (block 510) from each radio frequency enabled device 141-148 within the cluster 151 of radio frequency enabled devices 141-158 and transmitting the status via the data plane to the external user (block 520).

When the computer executable instructions 500 are executed by the one or more processors 414, the computer executable instructions 500 may cause the one or more processors 414 to retrieve a unique cluster identifier from a data storage device (block 505), wherein the unique cluster identifier is associated with two or more radio frequency enabled devices within a cluster 151 of radio frequency enabled devices; request a status via a control plane (block 510) from each radio frequency enabled device within a subset of the cluster 151 of radio frequency enabled devices; and transmit the status to an external user (block 520) via the data plane within a telecommunications network. The computer executable instructions 500 may cause the one or more processors 414 to request the status via the control plane (block 510) from each radio frequency enabled device within the cluster 151 of radio frequency enabled devices, where the status may include the location for each radio frequency enabled device 141-148 within the cluster 151 of radio frequency enabled devices. The computer executable instructions 500 may cause the one or more processors 414 to receive the location (Block 512) from two or more radio frequency enabled devices within the cluster 151 of radio frequency enabled devices; determine a triangulated central location (Block 514) of the two or more radio frequency enabled devices within the cluster 151 of radio frequency enabled devices; and determine the distances (Block 516) between the triangulated central location (Block 514) and each radio frequency enabled device within the cluster 151 of radio frequency enabled devices.

When the computer executable instructions 500 are executed by the one or more processors 414, the computer executable instructions 500 may cause the one or more processors 414 to transmit an alert message (Block 518) via the control plane to the subset of the radio frequency enabled devices within the cluster 151 of radio frequency enabled devices when one or more radio frequency enabled devices within the cluster 151 of radio frequency enabled devices is a configurable distance (block 516) from the determined triangulated central location (block 514). The computer executable instructions 500 may cause the one or more processors 414 to transmit a message to an external user (block 520) via the data plane when the location for one or more radio frequency enabled devices within the cluster 151 of radio frequency enabled devices is not received, wherein the message identifies the one or more radio frequency enabled devices from which the location is not received. The message may be sent to the external user (block 520) when a configurable period of time lapses after the request for status via the control plane (block 510) is sent and the location is not received.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for managing clustered subscriptions, comprising:
   identifying one or more radio frequency enabled devices, each having a radio frequency enabled device unique identifier, to add to a cluster;
   requesting a unique cluster identifier from a control plane within a telecommunications network;
   generating the unique cluster identifier;
   associating the unique cluster identifier with each of the one or more radio frequency enabled device unique identifiers;
   storing, in the control plane, the unique cluster identifier in association with each of the one or more radio frequency enabled device unique identifiers;
   requesting, via the control plane, a status from each radio frequency enabled device within a subset of the radio frequency enabled devices;
   transmitting the status to an external user via a data plane within the telecommunications network;
   monitoring the location of each radio frequency enabled device by periodically requesting a status from each radio frequency enabled device, wherein requesting the status comprises
   requesting a location for each of the one or more radio frequency enabled devices;
   receiving the location from two or more radio frequency enabled devices;
   determining a triangulated central location of the two or more radio frequency enabled devices;
   determining the distance between the triangulated central location and each of the one or more radio frequency enabled devices; and
   transmitting a message via the data plane when at least one of the radio frequency enabled devices is determined to be a configurable distance from the triangulated central location.

2. The method of claim 1, wherein requesting the status from each radio frequency enabled device within the subset of the radio frequency enabled devices comprises requesting a location from each of two or more radio frequency enabled devices in the subset of the radio frequency enabled devices.

3. The method of claim 2, further comprising receiving each location from each of the two or more radio frequency enabled devices and determining a central location of the radio frequency enabled devices by triangulating the received locations.

4. The method of claim 1, further comprising providing the unique identifiers to the control plane, wherein the subset of the radio frequency enabled devices is chosen from a list provided to the control plane.

5. The method of claim 1, wherein the subset of the radio frequency enabled devices is chosen randomly by the control plane.

6. The method of claim 1, further comprising requesting a status from each of the one or more radio frequency enabled devices via the control plane utilizing the unique cluster identifier.

7. The method of claim 1, further comprising: transmitting a message via the data plane when the location for one or more of the radio frequency enabled devices is not received, wherein the message identifies the one or more radio frequency enabled devices.

8. The method of claim 1, further comprising:
   transmitting an alert message, via the control plane, to the subset of the radio frequency enabled devices when at least one of the radio frequency enabled devices is a configurable distance from the triangulated central location.

9. A system comprising:
   one or more processors; and
   a computer-readable storage medium encoded with instructions that, when executed by the one or more processors cause the one or more processors to:
   receive a list of radio frequency enabled device unique identifiers for a plurality of radio frequency enabled devices;
   generate a unique cluster identifier;
   associate the unique cluster identifier with each of the radio frequency enabled device unique identifiers;
   store the unique cluster identifier in association with each of the radio frequency enabled device unique identifiers;
   request a status, via a control plane, from each radio frequency enabled device within a subset of the radio frequency enabled devices;
   transmit the status to an external user via a data plane within a telecommunications network, monitor the location of each radio frequency enabled device by periodically requesting a status from each radio frequency enabled device, wherein requesting the status comprises requesting a location for each radio frequency enabled device;
   receive the location from two or more radio frequency enabled devices;
   determine a triangulated central location of the two or more radio frequency enabled devices;
   determine the distance between the triangulated central location and each radio frequency enabled device; and
   transmit a message to an external user via the data plane when a radio frequency enabled device is determined to be a configurable distance from the triangulated central location.

10. The system of claim 9, wherein requesting the status from each radio frequency enabled device within a subset of the radio frequency enabled devices comprises requesting a location from each of two or more radio frequency enabled devices from the subset of the radio frequency enabled devices.

11. The system of claim 9, wherein the computer-readable storage medium is further encoded with instructions that, when executed by the one or more processors cause the one or more processors to: determine the distance between each radio frequency enabled device and a predetermined path.

12. The system of claim 9, wherein the computer-readable storage medium is further encoded with instructions that, when executed by the one or more processors cause the one or more processors to: request a status from each of the radio frequency enabled devices utilizing the unique cluster identifier.

13. The system of claim 9, wherein the computer-readable storage medium is further encoded with instructions that, when executed by the one or more processors cause the one or more processors to transmit an alert message to the subset of the radio frequency enabled devices when a radio frequency enabled device is a configurable distance from the triangulated central location.

14. The system of claim 9, wherein the computer-readable storage medium is further encoded with instructions that, when executed by the one or more processors cause the one or more processors to transmit a message to the external user via the data plane when the location for one or more radio frequency enabled devices is not received, wherein the message identifies the one or more radio frequency enabled devices.

15. A non-transitory computer-readable medium comprising computer executable instructions stored thereon that when executed by one or more processors, cause the one or more processors to:
retrieve a unique cluster identifier from a data storage device, wherein the unique cluster identifier is associated with two or more radio frequency enabled devices within a cluster of radio frequency enabled devices;
request a status via a control plane from each radio frequency enabled device within a subset of the cluster of radio frequency enabled devices;
transmit the status to an external user via a data plane within a telecommunications network;
request the status from each radio frequency enabled device within the cluster of radio frequency enabled devices, wherein requesting the status comprises requesting a location for each radio frequency enabled device within the cluster of radio frequency enabled devices;
receive the location from two or more radio frequency enabled devices within the cluster of radio frequency enabled devices;
determine a triangulated central location of the two or more radio frequency enabled devices within the cluster of radio frequency enabled devices; and
determine the distance between the triangulated central location and each radio frequency enabled device within the cluster of radio frequency enabled devices.

16. The non-transitory computer-readable medium of claim 15, wherein the non-transitory computer-readable medium comprises further instructions executable by the processor to: transmit an alert message via the control plane to the subset of the cluster of the radio frequency enabled devices within the cluster of radio frequency enabled devices when one or more radio frequency enabled devices within the cluster of radio frequency enabled devices is a configurable distance from the triangulated central location.

17. The non-transitory computer-readable medium of claim 15, wherein the non-transitory computer-readable medium comprises further instructions executable by the processor to: transmit a message to an external user via the data plane when the location for one or more radio frequency enabled devices within the cluster of radio frequency enabled devices is not received, wherein the message identifies the one or more radio frequency enabled devices from which the location is not received.

18. The non-transitory computer-readable medium of claim 15, wherein the instructions executable by the processor to request the status from each radio frequency enabled device within the subset of the cluster of the radio frequency enabled devices comprises requesting a location from each of two or more radio frequency enabled devices in the subset of the cluster of the radio frequency enabled devices.

19. The non-transitory computer-readable medium of claim 15, wherein the non-transitory computer-readable medium comprises further instructions executable by the processor to:
provide the unique cluster identifier to the control plane, wherein the subset of the cluster of the radio frequency enabled devices is chosen from a list provided to the control plane.

20. The non-transitory computer-readable medium of claim 15, wherein the non-transitory computer-readable medium comprises further instructions executable by the processor to: request a status from each of the two or more radio frequency enabled devices via the control plane utilizing the unique cluster identifier.

* * * * *